United States Patent
Gould

(10) Patent No.: US 6,560,562 B2
(45) Date of Patent: May 6, 2003

(54) METHOD OF ESTIMATING PRECISION OF APPARATUS

(75) Inventor: Gregory Gould, 2 Lilac Pl., Thornwood, NY (US) 10594-2102

(73) Assignee: Gregory Gould, Bye, NY (US)

( * ) Notice: Subject to any disclaimer, the term of this patent is extended or adjusted under 35 U.S.C. 154(b) by 289 days.

(21) Appl. No.: 09/783,678

(22) Filed: Feb. 14, 2001

(65) Prior Publication Data

US 2002/0169579 A1 Nov. 14, 2002

(51) Int. Cl.[7] .............................................. G06F 15/00
(52) U.S. Cl. ....................................... 702/181; 382/141
(58) Field of Search ............................... 702/176, 177, 702/178, 179, 180, 181, 60, 61, 62, 63, 64, 185, 186, 187, 8; 324/300, 307, 309; 386/21, 40, 86; 382/141, 148, 149

(56) References Cited

U.S. PATENT DOCUMENTS

| | | | | |
|---|---|---|---|---|
| 5,072,387 A | * | 12/1991 | Griston et al. ................. 702/8 |
| 5,492,547 A | * | 2/1996 | Johnson ....................... 800/266 |
| 5,694,474 A | * | 12/1997 | Ngo et al. ...................... 381/66 |
| 5,864,633 A | * | 1/1999 | Opsal et al. ................. 382/141 |
| 5,937,372 A | | 8/1999 | Gould ......................... 702/181 |

* cited by examiner

Primary Examiner—Marc S. Hoff
Assistant Examiner—Mohamed Charioui
(74) Attorney, Agent, or Firm—John L. Gray

(57) ABSTRACT

A method of estimating the precision of an apparatus that generates a continuous stream of information. The method comprises repeated resampling of the dataset defined by the data stream for a selected time interval, or repeated sampling of a theoretical distribution fitted to a dataset defined by the data stream for a selected interval, calculating the sample estimate of the population mean for each resample, calculating the index of precision from the series of the population means thus obtained for evaluation against a benchmark such as a standard value, a specification or a contract requirement. Calculations can be done by a microprocessor and microprocessor instructions internal to the instrument or by a microprocessor and microprocessor instructions external to the instruments.

17 Claims, No Drawings

METHOD OF ESTIMATING PRECISION OF APPARATUS

BACKGROUND OF THE INVENTION

The notion of precision is founded on the precept of repeatability and is defined as the closeness of agreement between repeated measurements of the same object with the same measurement means. Heretofore, slow expensive often labor intensive and operationally disruptive physical tests, such as materials tests or the "Grubbs test", have been used to estimate the precision of a diverse collection of apparatuses, ranging from belt scales to on-line nuclear analyzers. The "Grubbs test" acquires its name from the Grubbs estimators procedure developed by Frank E. Grubbs (1972). Grubbs developed this procedure to fill the void where it was physically impossible to make multiple measurements on the same object with the same measurement means. This application of the Grubbs method presumes the existence of this condition, and necessitates replication of observations by means external to and independent of the first means. The Grubbs estimators method is based on the laws of propagation of error. By making three independent simultaneous measurements on the same physical material, it is possible by appropriate mathematical manipulation of the sums and differences of the associated variances to obtain a valid estimate of the precision of the primary means. Application of the Grubbs estimators procedure to estimation of the precision of an apparatus uses the results of a physical test conducted in such a way as to obtain a series of sets of three independent observations.

Common to apparatuses of this type is a response to some physical, chemical, or other property of an object, said response being comprised of a continuous analog or digital stream of information. Generation of a continuous stream of information for a given time period creates a finite population of data, which is definable by various statistical parameters, such as its mean and variance. It is the repeatability of the estimated population parameters that defines the precision of said apparatuses. An improvement on the Grubbs estimators procedure for estimating the precision of an apparatus is set forth in applicant's U.S. Pat. No. 5,937,372 wherein the method comprises dividing said stream of information from said apparatus into successive or overlapping pairs and calculating an index of precision therefrom for evaluation against a benchmark such as a standard value, a specification, or a contract requirement. The method set forth in U.S. Pat. No. 5,937,372 is a considerable improvement over application of the Grubbs estimators procedure to the results of a physical test because it avoids the need for conduct of the physical test and can be implemented in real time.

SUMMARY OF THE INVENTION

This invention addresses use of methods that belong to the class of statistical procedures known as Bootstrap/Jackknife data resampling methods to obtain estimates of precision of an apparatus for evaluation against a benchmark such as a standard value, a specification, or a contract requirement. The technique originally introduced by M. Quenouille (1949) for estimating the bias of a statistical estimator, was later recognized by J. W. Tukey (1958) as a method that could be extended to construct variance estimators. The technology is very calculation intensive and has advanced rapidly only in the last decade as powerful desktop computers became commonplace.

The Bootstrap/Jackknife data resampling methods, as improvements in the invention set forth in U.S. Pat. No. 5,937,372, offer unique advantages. A dataset of size n, comprised of all the members of a finite population, has $2^n-1$ non-empty subsets. The method set forth in U.S. Pat. No. 5,937,372 uses two of them. The Jackknife uses n of them and the Bootstrap uses more than n or even all $2^n-1$ subsets. The use of increasingly more subsets correspondingly improves the estimates of the population parameters and of the estimated index of precision. Since precision is unique to the sampling scheme employed, the Bootstrap/Jackknife data resampling methodology offers the added advantage over current practice that it permits emulation of virtually any desired sampling scheme including stratified random sampling and techniques to take advantage of serial correlation. This capability allows optimization of the sampling scheme to meet precision objectives. The Grubbs test applied to the results of physical samples, because the constraints of mechanical sampling systems, are very restrictive often not permitting a Grubbs test sampling scheme comparable to the sampling schemes that would normally be used in routine daily operations.

This invention using application of the Bootstrap/Jackknife data resampling methodology involves repeated resampling of a dataset (population) defined by a data stream for a selected time interval, or a theoretical distribution fitted to a dataset defined by a data stream for a selected time interval. The average estimated index of precision is calculated from a large number of iterations. The exact number of said iterations is discretionary and can run into thousands for relatively small datasets. Calculations can be done by microprocessor and microprocessor instructions internal to the apparatus or by microprocessor and microprocessor instructions external to the apparatus.

A specific dataset (population) defined by a data stream for a selected time interval is only a part of a universe of said data and as such is incomplete, though comprising all available information, and may exhibit anomalous departures from the distribution that is characteristic of the entire universe for said data. A means for minimizing the effects of said anomalous departures consists of fitting a theoretical distribution to said dataset by using techniques such as the generalized lambda distribution or the generalized bootstrap distribution, and resampling said theoretical distribution. The fitting of a theoretical distribution to a specific dataset adds additional calculations to an already computationally intensive process. Its use therefore would depend on balancing the benefits against said additional computation demands.

DETAILED DESCRIPTION OF THE INVENTION

The invention will be described using repeated resampling of a dataset (population) defined by a data stream for a selected time interval with respect to the estimation of the precision of an on-line nuclear analyzer measuring coal ash content. However, it should be understood that the invention is applicable to any apparatus which generates, internally or externally, a continuous stream of information including devices such as belt scales, loss-in-weight feeders, or apparatuses such as a microwave moisture meter to measure variables of importance, either on a stand-alone basis or embedded in continuous processes such as oil-refineries, steel mills, cement plants, and paper mills.

Moreover, it should be understood that repeated resampling of a theoretical distribution fitted to a dataset defined by a data stream for a selected time interval could also be employed as an alternative, if desired.

The on-line nuclear analyzer is relatively new technology and continual comparison of analyzer results with results of physical samples from ongoing routine operations that are obtained by conventional sampling and testing is common.

Under these conditions, capability to emulate the sampling scheme associated with daily routine operations provides a dimension of comparability that would otherwise be lacking. This illustrative example will demonstrate application of the bootstrap methodology to the estimation of the precision of a nuclear analyzer utilizing a sublot-sampling scheme common to routine daily operations. By practicing the method of the present invention, precision estimates of the measurements made by the on-line nuclear analyzer on-the-fly in real time under comparable conditions associated with routine daily operations are obtained from the information generated wholly and entirely by the analyzer itself.

By way of illustration, the bootstrap data resampling method will be hereinafter described as applied to the ash content dataset generated by the nuclear analyzer for a 10,000-ton lot of coal over a period of eight hours. The continuous stream of data generated at a rate of one data item per minute have been listed in ten columns of forty eight rows, each column containing the data for one sublot as shown in Table 1.

TABLE #1

Ash Data For Sublots A Through J

| S/N | A | B | C | D | E | F | G | H | I | J |
|---|---|---|---|---|---|---|---|---|---|---|
| 1 | 9.27 | 10.24 | 8.21 | 14.90 | 10.72 | 10.13 | 10.01 | 10.91 | 9.45 | 9.41 |
| 2 | 10.38 | 10.14 | 7.10 | 14.34 | 9.54 | 9.94 | 10.25 | 11.35 | 9.94 | 10.04 |
| 3 | 9.47 | 9.47 | 9.13 | 13.43 | 11.47 | 9.58 | 10.08 | 9.79 | 10.59 | 9.78 |
| 4 | 10.18 | 8.95 | 7.18 | 13.96 | 10.86 | 10.81 | 10.21 | 9.20 | 10.36 | 9.49 |
| 5 | 10.36 | 8.97 | 7.12 | 13.51 | 12.76 | 10.28 | 9.17 | 11.39 | 9.46 | 10.44 |
| 6 | 9.44 | 9.55 | 8.34 | 14.36 | 12.87 | 10.99 | 9.09 | 10.06 | 10.06 | 10.41 |
| 7 | 10.83 | 8.86 | 8.56 | 14.93 | 11.16 | 10.49 | 10.22 | 11.42 | 8.87 | 10.51 |
| 8 | 10.31 | 8.79 | 7.82 | 14.26 | 12.66 | 10.94 | 8.35 | 10.87 | 11.23 | 9.81 |
| 9 | 9.49 | 7.98 | 8.78 | 13.99 | 11.89 | 11.14 | 10.33 | 10.48 | 10.07 | 10.94 |
| 10 | 10.78 | 8.00 | 6.35 | 14.65 | 11.09 | 10.23 | 10.99 | 10.08 | 10.77 | 9.94 |
| 11 | 9.34 | 6.72 | 8.35 | 12.54 | 11.90 | 10.88 | 10.01 | 10.77 | 10.98 | 10.42 |
| 12 | 10.24 | 8.92 | 8.33 | 15.30 | 11.15 | 11.02 | 9.06 | 10.52 | 9.34 | 10.85 |
| 13 | 10.04 | 8.91 | 8.35 | 13.06 | 10.93 | 10.66 | 8.46 | 9.96 | 11.27 | 9.02 |
| 14 | 11.17 | 8.31 | 8.58 | 12.82 | 10.73 | 10.91 | 9.05 | 10.40 | 9.33 | 13.30 |
| 15 | 9.46 | 8.64 | 7.36 | 14.17 | 11.06 | 10.18 | 9.41 | 9.78 | 9.70 | 10.73 |
| 16 | 10.09 | 8.94 | 9.01 | 13.78 | 11.05 | 10.69 | 9.67 | 10.59 | 8.01 | 9.83 |
| 17 | 10.22 | 8.49 | 9.96 | 13.70 | 12.62 | 9.83 | 9.39 | 10.21 | 10.46 | 10.71 |
| 18 | 10.02 | 8.11 | 11.31 | 15.13 | 11.09 | 10.33 | 10.76 | 9.50 | 10.92 | 9.36 |
| 19 | 9.74 | 9.38 | 11.81 | 15.33 | 10.54 | 10.21 | 9.38 | 9.80 | 11.03 | 9.99 |
| 20 | 10.77 | 9.39 | 12.44 | 14.23 | 10.79 | 10.33 | 9.98 | 9.53 | 10.48 | 9.54 |
| 21 | 9.43 | 8.45 | 13.66 | 14.53 | 12.45 | 9.24 | 9.55 | 8.60 | 9.56 | 9.30 |
| 22 | 10.02 | 9.22 | 13.84 | 13.59 | 12.92 | 8.93 | 10.76 | 8.66 | 9.15 | 10.14 |
| 23 | 11.30 | 9.17 | 12.94 | 14.04 | 10.68 | 10.34 | 8.39 | 9.68 | 11.27 | 9.65 |
| 24 | 11.81 | 8.10 | 14.08 | 14.45 | 10.36 | 10.20 | 10.86 | 9.90 | 8.56 | 10.99 |
| 25 | 10.01 | 10.19 | 12.61 | 13.15 | 10.30 | 10.18 | 9.93 | 10.04 | 9.61 | 10.32 |
| 26 | 9.82 | 9.84 | 13.43 | 12.79 | 11.46 | 10.24 | 8.35 | 8.90 | 10.75 | 9.83 |
| 27 | 9.63 | 9.35 | 14.22 | 13.66 | 11.20 | 10.87 | 9.75 | 9.23 | 11.55 | 10.69 |
| 28 | 10.29 | 8.29 | 14.72 | 12.42 | 10.42 | 10.06 | 9.94 | 11.17 | 10.30 | 10.17 |
| 29 | 10.09 | 8.34 | 13.99 | 12.88 | 10.18 | 10.04 | 10.47 | 9.93 | 10.18 | 10.23 |
| 30 | 10.04 | 8.51 | 14.40 | 14.60 | 13.04 | 9.58 | 10.38 | 9.86 | 11.11 | 9.96 |
| 31 | 10.74 | 9.47 | 13.16 | 12.23 | 10.97 | 9.69 | 8.41 | 10.32 | 9.98 | 9.24 |
| 32 | 8.91 | 8.62 | 12.88 | 14.42 | 11.02 | 12.04 | 9.59 | 9.63 | 8.85 | 10.01 |
| 33 | 9.72 | 7.59 | 13.57 | 14.11 | 9.73 | 9.99 | 8.63 | 9.89 | 10.62 | 10.70 |
| 34 | 10.90 | 8.67 | 12.86 | 14.35 | 8.78 | 10.41 | 10.07 | 9.26 | 11.84 | 9.38 |
| 35 | 10.71 | 8.34 | 14.82 | 13.46 | 9.69 | 8.94 | 11.42 | 10.46 | 9.67 | 8.57 |
| 36 | 11.23 | 8.51 | 14.72 | 13.79 | 9.19 | 9.90 | 9.81 | 9.24 | 10.74 | 10.18 |
| 37 | 11.45 | 8.64 | 13.95 | 12.50 | 9.62 | 10.39 | 9.58 | 9.58 | 9.18 | 9.12 |
| 38 | 11.05 | 6.57 | 14.72 | 14.16 | 10.18 | 10.15 | 9.21 | 10.86 | 9.17 | 9.05 |
| 39 | 10.23 | 7.17 | 13.63 | 13.56 | 10.33 | 11.05 | 9.33 | 9.11 | 10.17 | 9.60 |
| 40 | 9.85 | 8.39 | 13.09 | 13.37 | 11.25 | 10.52 | 9.92 | 8.87 | 9.13 | 10.58 |
| 41 | 11.95 | 8.83 | 13.51 | 14.80 | 8.81 | 9.22 | 10.27 | 9.78 | 10.10 | 10.85 |
| 42 | 10.84 | 8.53 | 14.06 | 13.23 | 11.15 | 10.49 | 9.62 | 8.82 | 10.54 | 8.99 |
| 43 | 10.09 | 9.03 | 14.20 | 13.34 | 9.96 | 9.91 | 10.54 | 9.51 | 9.89 | 10.18 |
| 44 | 9.96 | 8.90 | 14.71 | 12.66 | 10.09 | 10.12 | 8.52 | 10.95 | 10.98 | 8.51 |
| 45 | 9.15 | 7.25 | 14.46 | 12.84 | 10.20 | 10.90 | 9.58 | 10.91 | 9.00 | 9.72 |
| 46 | 10.88 | 9.03 | 15.32 | 11.84 | 9.71 | 9.69 | 9.15 | 9.79 | 9.11 | 10.65 |
| 47 | 10.44 | 7.39 | 13.50 | 10.68 | 9.94 | 9.33 | 9.91 | 8.96 | 10.19 | 9.01 |
| 48 | 9.49 | 8.27 | 13.51 | 11.03 | 10.71 | 8.70 | 9.75 | 10.96 | 10.64 | 9.78 |

The sampling scheme that has been used, samples the lot as ten sublots each of which is sampled in duplicate according to the sampling scheme described in the International Standards Organization Standard Number 13909-7, which covers methods of determining the precision of sampling, sample preparation and testing. Clause 7.2. relates to duplicate sampling. The data is sampled by selecting individual observations at random from each sublot for both samples. At the end of the first iteration of the sampling of the lot, there are two samples from each sublot. The average of each sample together with the variance of the two averages for each sublot are calculated. See Table #2, which lists the data for the first iteration for five of the sublots A through E.

TABLE #2

Sample Data for Sublots A Through E For A Single Iteration

| Obs. No. | Sublot A | | Sublot B | | Sublot C | | Sublot D | | Sublot E | |
|---|---|---|---|---|---|---|---|---|---|---|
| | Sample 1 | Sample 2 | Sample 1 | Sample 2 | Sample 1 | Sample 2 | Sample 1 | Sample 2 | Sample 1 | Sample 2 |
| 1 | 10.840 | 10.090 | 8.294 | 8.338 | 8.342 | 8.559 | 13.430 | 13.960 | 10.790 | 12.450 |
| 2 | 10.010 | 9.817 | 6.718 | 8.916 | 14.460 | 15.320 | 14.450 | 13.150 | 9.536 | 11.470 |
| 3 | 9.493 | 9.266 | 7.174 | 8.389 | 11.310 | 11.810 | 13.340 | 12.660 | 11.020 | 9.733 |
| 4 | 9.956 | 9.153 | 10.190 | 9.844 | 14.720 | 13.990 | 15.300 | 13.060 | 11.090 | 11.900 |
| 5 | 11.230 | 11.450 | 6.566 | 7.174 | 13.990 | 14.400 | 13.690 | 15.130 | 10.180 | 10.330 |
| 6 | 10.040 | 11.170 | 10.140 | 9.466 | 8.351 | 8.578 | 11.840 | 10.680 | 10.540 | 10.790 |
| 7 | 9.817 | 9.631 | 8.389 | 8.827 | 14.080 | 12.610 | 12.880 | 14.600 | 11.060 | 11.050 |
| 8 | 10.380 | 9.467 | 7.245 | 9.032 | 13.990 | 14.400 | 12.660 | 12.840 | 8.813 | 11.150 |
| 9 | 10.090 | 10.040 | 8.910 | 8.308 | 14.460 | 15.320 | 13.780 | 13.690 | 9.189 | 9.618 |
| 10 | 10.740 | 8.914 | 7.174 | 8.389 | 13.160 | 12.880 | 13.460 | 13.790 | 10.720 | 9.536 |
| 11 | 11.950 | 10.840 | 8.112 | 9.378 | 14.710 | 14.460 | 12.880 | 14.600 | 9.536 | 11.470 |
| 12 | 10.180 | 10.360 | 8.943 | 8.492 | 7.363 | 9.010 | 13.430 | 13.960 | 11.150 | 10.930 |
| 13 | 10.380 | 9.467 | 10.140 | 9.466 | 13.840 | 12.940 | 14.530 | 13.590 | 10.790 | 12.450 |
| 14 | 9.266 | 10.380 | 9.378 | 9.393 | 14.080 | 12.610 | 10.680 | 11.030 | 12.920 | 10.680 |
| 15 | 10.360 | 9.438 | 8.492 | 8.112 | 8.342 | 8.559 | 15.300 | 13.060 | 10.330 | 11.250 |
| 16 | 10.090 | 10.220 | 8.513 | 8.643 | 8.348 | 8.334 | 12.880 | 14.600 | 11.150 | 9.959 |
| 17 | 10.880 | 10.440 | 8.904 | 7.245 | 8.784 | 6.349 | 13.230 | 13.340 | 10.090 | 10.200 |
| 18 | 10.360 | 9.438 | 6.718 | 8.916 | 14.200 | 14.710 | 14.900 | 14.340 | 11.060 | 11.050 |
| 19 | 10.090 | 9.956 | 9.173 | 8.101 | 14.720 | 13.990 | 12.880 | 14.600 | 10.360 | 10.300 |
| 20 | 11.170 | 9.456 | 6.566 | 7.174 | 7.363 | 9.010 | 13.150 | 12.790 | 12.760 | 12.870 |
| 21 | 10.310 | 9.494 | 8.492 | 8.112 | 8.784 | 6.349 | 12.880 | 14.600 | 10.300 | 11.460 |
| 22 | 10.380 | 9.467 | 9.466 | 8.950 | 13.090 | 13.510 | 14.230 | 14.530 | 10.970 | 11.020 |
| 23 | 11.170 | 9.456 | 8.340 | 8.513 | 13.950 | 14.720 | 13.780 | 13.690 | 12.920 | 10.680 |
| 24 | 10.290 | 10.090 | 8.340 | 8.513 | 13.500 | 13.510 | 13.430 | 13.960 | 10.200 | 9.709 |
| 25 | 9.153 | 10.880 | 9.220 | 9.173 | 13.660 | 13.840 | 13.660 | 12.420 | 9.618 | 10.180 |
| 26 | 10.220 | 10.020 | 8.974 | 9.555 | 7.822 | 8.784 | 13.790 | 12.500 | 11.900 | 11.150 |
| 27 | 9.456 | 10.090 | 8.112 | 9.378 | 13.430 | 14.220 | 13.510 | 14.360 | 11.470 | 10.860 |
| 28 | 10.010 | 9.817 | 8.615 | 7.592 | 7.119 | 8.342 | 13.590 | 14.040 | 11.200 | 10.420 |
| 29 | 9.431 | 10.020 | 8.340 | 8.513 | 14.400 | 13.160 | 12.880 | 14.600 | 12.920 | 10.680 |
| 30 | 11.810 | 10.010 | 8.508 | 9.471 | 7.822 | 8.784 | 12.820 | 14.170 | 12.920 | 10.680 |
| 31 | 8.914 | 9.722 | 8.943 | 8.492 | 8.348 | 8.334 | 14.450 | 13.150 | 11.460 | 11.200 |
| 32 | 10.360 | 9.438 | 7.386 | 8.268 | 13.630 | 13.090 | 12.420 | 12.880 | 11.160 | 12.660 |
| 33 | 10.020 | 11.300 | 9.220 | 9.173 | 7.181 | 7.119 | 14.160 | 13.560 | 10.180 | 10.330 |
| 34 | 10.360 | 9.438 | 8.904 | 7.245 | 14.200 | 14.710 | 13.150 | 12.790 | 11.090 | 11.900 |
| 35 | 9.456 | 10.090 | 8.667 | 8.340 | 8.784 | 6.349 | 13.060 | 12.820 | 10.860 | 12.760 |
| 36 | 10.010 | 9.817 | 8.000 | 6.718 | 13.500 | 13.510 | 10.680 | 11.030 | 10.180 | 13.040 |
| 37 | 8.914 | 9.722 | 10.190 | 9.844 | 7.099 | 9.131 | 14.260 | 13.990 | 10.970 | 11.020 |
| 38 | 10.090 | 10.040 | 8.294 | 8.338 | 13.090 | 13.510 | 12.790 | 13.660 | 10.860 | 12.760 |
| 39 | 11.300 | 11.810 | 8.791 | 7.982 | 14.720 | 13.950 | 13.990 | 14.650 | 9.690 | 9.189 |
| 40 | 10.780 | 9.340 | 9.030 | 8.904 | 7.119 | 8.342 | 14.800 | 13.230 | 10.330 | 11.250 |
| 41 | 11.810 | 10.010 | 7.386 | 8.268 | 13.950 | 14.720 | 14.650 | 12.540 | 10.730 | 11.060 |
| 42 | 11.450 | 11.050 | 8.513 | 8.643 | 6.349 | 8.348 | 14.530 | 13.590 | 11.020 | 9.733 |
| 43 | 10.090 | 10.220 | 9.032 | 7.386 | 13.430 | 14.220 | 12.230 | 14.420 | 11.160 | 12.660 |
| 44 | 9.817 | 9.631 | 8.508 | 9.471 | 13.160 | 12.880 | 12.820 | 14.170 | 11.050 | 12.620 |
| 45 | 9.431 | 10.020 | 7.982 | 8.000 | 9.131 | 7.181 | 10.680 | 11.030 | 10.330 | 11.250 |
| 46 | 10.380 | 9.467 | 8.667 | 8.340 | 8.342 | 8.559 | 14.160 | 13.560 | 10.860 | 12.760 |
| 47 | 11.050 | 10.230 | 8.389 | 8.827 | 7.099 | 9.131 | 12.660 | 12.840 | 10.330 | 11.250 |
| 48 | 9.431 | 10.020 | 8.950 | 8.974 | 8.578 | 7.363 | 14.420 | 14.110 | 11.890 | 11.090 |
| Averages | 10.275 | 9.994 | 8.479 | 8.554 | 11.248 | 11.323 | 13.399 | 13.466 | 10.868 | 11.137 |
| Variance | | 0.0396 | | 0.0028 | | 0.0028 | | 0.0022 | | 0.03611 |

In this instance the average for the lot is the average of the sublot averages, the average sublot variance for the lot is the average of the sublot variances, and the lot variance is the average sublot variance divided by the number of sublots. For the purposes of this illustration, this process has been repeated five thousand times. The final average for the lot is the average of the five thousand lot averages. The final variance for the lot is the average of the five thousand lot variances.

The International Standards Organization standard defines the precision of this sampling scheme as:

$$P = \frac{2s}{\sqrt{K}}$$

Where
P=index of precision
s=within sublot standard deviation
K=the number of sublots comprising the lot
The nuclear analyzer data yields the following results:

| | |
|---|---|
| Lot Average | 10.511 |
| Sublot Standard Deviation | 0.111 |
| Number of Sublots | 10 |
| Precision | 0.07 |

Any other index of precision such as different multiples of the standard deviation or of the variance can also be generated.

While this invention has been shown and described with respect to a detailed embodiment thereof, it will be understood by those skilled in the art that various changes in form and detail thereof may be made without departing from the scope of the claims of the invention.

What is claimed is:

1. A method of estimating the precision of an apparatus that generates a continuous stream of information internally or externally, which comprises the steps of either repeated resampling of the dataset defined by said stream of information for a selected time interval or repeated resampling of a theoretical distribution fitted to a dataset defined by said stream of information for a selected time interval, calculating the sample estimate of the population mean for each resample of said stream of information, calculating the index of precision from the series of population means thus obtained, and then evaluating said index of precision against a benchmark such as a standard value, a specification, or a contract requirement.

2. The method of claim 1 wherein the step of repeated resampling of the data set defined by said stream of information for a selected time interval is chosen.

3. The method of claim 2 wherein the apparatus is an on-line nuclear analyzer.

4. The method of claim 2 wherein the apparatus is on on-line microwave moisture meter.

5. The method of claim 2 wherein the apparatus is a belt scale.

6. The method of claim 2 wherein the apparatus is a loss-in-weight feeder.

7. The method of claim 2 wherein the apparatus is a weigh feeder.

8. The method of claim 2 wherein the apparatus measures paper thickness produced by a paper manufacturing machine.

9. The method of claim 2 wherein the apparatus is a venturi meter measuring a flow rate in a refinery.

10. The method of claim 1 wherein the step of repeated resampling of a theoretical distribution fitted to a dataset defined by said stream of information for a selected time interval is chosen.

11. The method of claim 10 wherein the apparatus is an on-line nuclear analyzer.

12. The method of claim 10 wherein the apparatus is on on-line microwave moisture meter.

13. The method of claim 10 wherein the apparatus is a belt scale.

14. The method of claim 10 wherein the apparatus is a loss-in-weight feeder.

15. The method of claim 10 wherein the apparatus is a weigh feeder.

16. The method of claim 10 wherein the apparatus measures paper thickness produced by a paper manufacturing machine.

17. The method of claim 10 wherein the apparatus is a venturi meter measuring a flow rate in a refinery.

* * * * *